(12) United States Patent
Weifenbach

(10) Patent No.: US 11,136,128 B2
(45) Date of Patent: Oct. 5, 2021

(54) AIRCRAFT SEAT KIT, AND AIRCRAFT SEAT AND CABIN ARRANGEMENT WITH DIFFERENT TYPES OF SEAT RAIL ADAPTERS

(71) Applicant: Airbus Operations GmbH, Hamburg (DE)

(72) Inventor: Jörg Weifenbach, Hamburg (DE)

(73) Assignee: Airbus Operations GmbH

( * ) Notice: Subject to any disclaimer, the term of this patent is extended or adjusted under 35 U.S.C. 154(b) by 928 days.

(21) Appl. No.: 15/805,251

(22) Filed: Nov. 7, 2017

(65) Prior Publication Data

US 2018/0134394 A1 May 17, 2018

(30) Foreign Application Priority Data

Nov. 16, 2016 (EP) .................................... 16199199

(51) Int. Cl.
*B64D 11/06* (2006.01)
*B60N 2/01* (2006.01)
*B60N 2/015* (2006.01)

(52) U.S. Cl.
CPC ............ *B64D 11/0696* (2013.01); *B60N 2/01* (2013.01); *B60N 2/01558* (2013.01); *B64D 11/0601* (2014.12)

(58) Field of Classification Search
CPC .................... B64D 11/0696; B64D 11/0601
See application file for complete search history.

(56) References Cited

U.S. PATENT DOCUMENTS

| 4,856,738 A * | 8/1989 | Martin .............. | B64D 11/0696 244/122 R |
| 4,913,489 A * | 4/1990 | Martin .............. | B64D 11/0696 248/429 |
| 4,936,527 A | 6/1990 | Gorges | |
| 5,183,313 A * | 2/1993 | Cunningham ..... | B64D 11/0696 248/429 |
| 5,657,950 A * | 8/1997 | Han ................... | B64D 11/0696 244/122 R |
| 7,232,094 B2 | 6/2007 | Bishop et al. | |

(Continued)

FOREIGN PATENT DOCUMENTS

| EP | 0094880 A1 * | 11/1983 | ......... B64D 11/0696 |
| EP | 2 397 409 A1 | 12/2011 | |
| EP | 2 689 498 B1 | 9/2015 | |

OTHER PUBLICATIONS

Jan. 18, 2017 Extended EP Search Report (EP 16199199.7).

*Primary Examiner* — Richard R. Green
(74) *Attorney, Agent, or Firm* — Lerner, David, Littenberg, Krumholz & Mentlik, LLP

(57) ABSTRACT

An aircraft seat kit with one aircraft seat, and an aircraft seat and cabin arrangement with at least two aircraft seats for being mounted one after the other onto a seat rail are described. The seat rail provides a grid with a pre-determined grid pitch for mounting the at least two aircraft seats. Each of the at least two aircraft seats includes: a seating structure, a support for supporting the seating structure, and one of two types of seat rail adapters for mounting the support onto the seat rail. The two types of seat rail adapters differ from each other in that they configure at least one aircraft seat with a different distance in a longitudinal direction between a seat reference point and a reference mounting position, respectively.

13 Claims, 3 Drawing Sheets

(56) References Cited

U.S. PATENT DOCUMENTS

| | | | |
|---|---|---|---|
| 8,628,053 B2* | 1/2014 | Marechal | B64D 11/0696 248/503.1 |
| 8,944,380 B2* | 2/2015 | Ehlers | B64D 11/0696 244/122 R |
| 2015/0145300 A1 | 5/2015 | Finlay et al. | |
| 2020/0086995 A1* | 3/2020 | Cheung | B64D 11/0696 |

* cited by examiner

AIRCRAFT SEAT KIT, AND AIRCRAFT SEAT AND CABIN ARRANGEMENT WITH DIFFERENT TYPES OF SEAT RAIL ADAPTERS

FIELD OF THE INVENTION

The invention relates to an aircraft seat kit with one aircraft seat, an aircraft seat arrangement with at least two aircraft seats and in particular, not yet exclusively to an aircraft cabin arrangement with at least two aircraft seats and a seat rail.

BACKGROUND OF THE INVENTION

Conventionally, the distribution of aircraft seats in aircraft cabin arrangements are limited by the grid pitch, normally 1 inch, of the seat rail onto which the aircraft seats are mounted. Moreover, the grid of the seat rail determines the mounting positions of the aircraft seats within the aircraft cabin, and hence restricts the flexibility for their distribution.

As the demand for a higher number of aircraft seats per cabin has increased, distributions of aircraft seats within the aircraft cabin have been suggested where the spacing between seats has been reduced from initially 31 or 32 inches (i.e. spacing permitted by the seat rail grid of 1 inch) to, nowadays 30 inches.

The limitations resulting from the grid pitch of the seat rail in the aircraft cabin arrangement have been identified as the origin of a loss in flexibility when distributing the aircraft seats therein.

EP 2 689 498 A2 suggests to remedy these limitations by providing the seat base frame with a translational guide which allows the seat support, and hence the aircraft seats, to be moved forward and backward in a longitudinal direction of the aircraft.

BRIEF SUMMARY OF THE INVENTION

An aspect of the invention may allow for aircraft seat distributions in the aircraft cabin which remedy the losses in flexibility resulting from the grid of the seat rail onto which the aircraft seats are mounted. In this context, a simple and robust aircraft seat construction is sought for, which at the same time does not result in excessive production costs.

According to an embodiment of the invention, the aircraft seat kit and the aircraft seats included in the aircraft seat arrangement and aircraft cabin arrangement have the advantageous effect of allowing more flexible aircraft seat distributions, namely where the spacing between aircraft seats is not restricted to a grid pitch of a seat rail onto which same aircraft seats are mounted. In other words, aspects of the invention particularly apply to aircraft seats that are mounted onto a seat rail providing a grid with a predetermined grid pitch.

A seat rail is located on a floor within an aircraft cabin and sits flush with the surface of the cabin floor. For a seat rail, there exist different geometries and constructions for the grid and the mounting mechanism thereto. Aspects of the invention apply to any of the seat rails as long as they have a grid and, hence, restrict the mounting positions for the aircraft seats.

The restrictions of seat rails result from the pre-determined grid pitch. Even though the grid of a seat rail and its pitch facilitates the mounting of aircraft seats onto the seat rail and provides a more secure connection thereto, this also reduces the flexibility in distributing the aircraft seats. The aircraft seat may only be spaced apart at a distance which is an integer multiples of the grid pitch.

In the aircraft cabin, the seat rail extends along the longitudinal direction of this aircraft cabin. This longitudinal direction coincides with the longitudinal direction of the aircraft. The aircraft seats are arranged one after the other along this longitudinal direction within the aircraft cabin arrangement. Also the spacing between two aircraft seats is defined along the same longitudinal direction of the aircraft cabin arrangement.

In the following description of the invention, reference is made to an aircraft cabin arrangement where two aircraft seats are mounted directly one after the other onto the seat rail provided on the floor of the aircraft cabin arrangement. In other words, the description focusses on two aircraft seats which are forming two subsequent rows of the aircraft cabin arrangement that are positioned next to each other on the seat rail.

However, the invention shall not be restricted in this respect. Rather, the concepts of the invention equally apply to the aircraft seat kit with one aircraft seat, and an aircraft seat arrangement with two aircraft seats that are mountable onto a seat rail in an aircraft cabin. Notably, all these aircraft seats make use of different types of seat rail adapters for mounting the aircraft seats onto the seat rail, thereby providing for the advantageous effect of allowing more flexible aircraft seat distributions.

The aircraft cabin arrangement according to an embodiment of the invention may have more than two aircraft seats that are mounted one after the other onto the seat rail. Particularly, the advantageous effect of an improved flexibility when mounting the aircraft seats becomes even more apparent for aircraft cabin arrangements with more than two aircraft seats.

Each one of the inventive aircraft seats includes a seating structure for a passenger to sit in. For this purpose, the seating structure may comprise a seat cushion with a seating area for the passenger to sit on. Further, the seating structure may also comprise a seat back (or backrest) for the passenger to rest his back against. Both, the seat cushion and the seat back are provided in a seat pan of the seating structure. Ancillary, the seating structure may also comprise seatbelts, arm-rests, un-foldable trays, seat pockets for magazines, information and entertainment screens, etc.

However, the invention shall not be restricted to the aircraft seats which include only one seating structure for one passenger to sit in. Rather, the aircraft seat according to an embodiment of the invention may also comprise additional seating structures, each with a respective seat pan, a seat cushion and a seat back such that the term aircraft seat may also be understood as defining a row of adjacent seating structures.

Notably, also in the latter case of an aircraft seat defining a row of adjacent seating structures, the aircraft cabin arrangement comprises at least two aircraft seat rows which are mounted one after the other onto the seat rail extending in the longitudinal direction of the aircraft cabin arrangement.

Furthermore, in an embodiment of the invention, each one of such aircraft seats also includes a support for supporting the seating structure. The support may be formed as an assembly with a plurality of struts providing stable support for the seating structure. Particularly, the support may support the seating structure at a pre-determined seating height and at a pre-determined spacing within the aircraft cabin arrangement.

Furthermore, in an embodiment of the invention each one of such aircraft seats also includes a seat rail adapter for mounting the support onto the seat rail within the aircraft cabin arrangement. In other words, the seat rail adapter provides a releasable connection of the aircraft seat to the seat rail, and accordingly, securely positions the aircraft seat within the aircraft cabin arrangement. Particularly, aspects of the invention propose two different types of seat rail adapters which are interchangeable to each other within the aircraft seats as shall be discussed in more detail in the following.

As already discussed earlier, the seat rail in the aircraft cabin provides a grid with a predetermined grid pitch for mounting aircraft seats. Particularly, the grid of the seat rail pre-determines mounting position where an aircraft seat may be mounted onto the seat rail within the aircraft cabin arrangement.

Accordingly, the seat rail adapter of each of the aircraft seats is configured for mounting the support, and accordingly the entire aircraft seat, at one of the mounting positions pre-determined by the seat rail. In other words, due to the grid of the seat rail, the aircraft seat may not be mounted arbitrarily onto the seat rail but only at the equidistant intervals pre-determined by the grid pitch of the seat rail.

Consequently, in the aircraft cabin two conventional aircraft seats are only mountable onto the seat rail at mounting positions that are spaced apart by integer multiples of the grid pitch of the seat rail. In other words, the grid pitch is the smallest unit step by which two conventional aircraft seats may be positioned closer towards or farther away from each other.

Conversely, an aspect of the invention proposes two different types of seat rail adapters to remedy this loss in flexibility. A first type of seat rail adapter is configured to mount the support, and accordingly the entire aircraft seat, in a first relative position to the grid of the seat rail. A second type of seat rail adapter is configured to mount the support, and accordingly the entire aircraft seat, in a second, different relative position to the grid of the seat rail.

Depending on which of the two types of seat rail adapters is included in the aircraft seat, the passenger's seating position assumes a different relative position with respect to the mounting position, i.e. with respect to the grid of the seat rail onto which the aircraft seat is mounted. In other words, since the two types of seat rail adapters allow for either the first relative position or the second relative position with respect to the grid of the seat rail, the passenger's seating position on two aircraft seats with different types of seat rail adapters are offset with respect to each other.

Particular, the offset resulting from the different types of seat rail adapters is in the longitudinal direction of the aircraft cabin arrangement, i.e. along the same direction in which the seat rail extends. Accordingly, the different types of seat rail adapters have an effect on the spacing between subsequent aircraft seats within the aircraft cabin arrangement, i.e. in the longitudinal direction thereof.

As already set out above, the inventive aircraft seats are mounted directly one after the other onto the seat rail, a first of the two aircraft seats includes one of the two types of seat rail adapters, and a second of the two aircraft seats includes the other of the two types of seat rail adapters. In other words, a first and a second of the two aircraft seats include different types of seat rail adapters.

In case of more than two aircraft seats, the plurality of aircraft seats may be mounted alternatingly with one and the other type of seat rail adapter onto the seat rail. In this respect, each pair of two subsequent aircraft seats, that are mounted one after the other onto the seat rail, includes different types of seat rail adapters.

Advantageously, due to the different types of seat rail adapters of the invention, the first and the second aircraft seat provide, in most general terms, a different passenger's seating position with respect to their mounting position on the seat rail. This difference will be expressed in the following with reference to dimensions commonly known in the field of aircraft seats.

Firstly, for an aircraft seat a seat reference point is commonly known and frequently used to define the passenger's seating position therein. The seat reference point is determined by the geometry of the seating structure which roughly approximates a passenger's seating position. For a more accurate approximation of the passenger's seating position, the compression of the seat cushions under the passenger's weight may also be accounted for.

For example, the seat reference point (SRP) may be approximated for a seating structure having seating area and a backrest extending upwards from the seating area as the connection between the seating area and the backrest, or expressed differently, as the intersection of the plane of the seat cushion (or seating area) with the plane perpendicular to the seat pan which touches the forward-most surface of the uncompressed center of the seat back (or backrest). This seat reference point is known as the cushion reference point.

For a more precise definition of the seat reference point, reference is made to the SAE International Aerospace Standard AS8049 in its latest version AS80049C, published on Aug. 14, 2015, available over the internet http://standards-.sae.org/ which is incorporated herein by reference.

In any case, for the purpose of the invention it is not necessary to refer to the most accurate definition of the seat reference point. Rather, as the aspects of the invention only refer to relative distances, it is sufficient when approximations of the seat reference point are considered. This holds true as long as the seat reference point is understood as a reference point for aircraft seats, i.e. which is commonly defined for the seating structures of the two or more aircraft seats within the aircraft cabin arrangement.

Secondly, for an aircraft seat a reference mounting position is commonly known and frequently used to define where the aircraft seat is mounted onto the seat rail. The reference mounting position is determined by the mounting mechanism. For example, in case the seat rail adapters utilize a mounting mechanism with studs that engage the seat rail, the foremost stud is commonly used as reference mounting position for the aircraft seat. However, for a different mounting mechanism (i.e. which does not rely on studs) a different reference may also be used.

In any case, for the purpose of the invention it is not decisive how the reference mounting position is defined. Rather, as the aspects of the invention only refer to relative distances, it is sufficient that the reference mounting position is understood as a reference point for aircraft seats, i.e. which is commonly defined for the two or more aircraft seats within the aircraft cabin arrangement.

On that basis, it can be readily appreciated that, according to an embodiment of the invention, the two types of seat rail adapters differ from each other in that they configure the first and second aircraft seat to have a different distance between the seat reference point and the reference mounting positions, respectively. The two types of seat rail adapters may also interchangeably configure one aircraft seat with the different distances between the seat reference point and the reference mounting positions. This difference in distance is in the longitudinal direction.

Each aircraft seat inherently has a distance between a seat reference point and a reference mounting position. This distance depends, among others, on the geometry and the construction of the aircraft seat, and hence, assuming a same geometry and construction, is equal for all aircraft seats. However, according to an embodiment of the invention, the first and second aircraft seats do not have a same geometry and construction.

In more detail, the first and second aircraft seats of an embodiment of the invention include different types of seat rail adapters, but at the same time include a same seating structure and a same support for supporting the seating structure. Hence, due to the different types of seat rail adapters the first and second aircraft seats, respectively, have different distances in the longitudinal direction between the seat reference point and the reference mounting position.

In other words, the two types of seat rail adapters differ from each other in that they configure the first and the second aircraft seats with a different distance in the longitudinal direction between the seat reference point and the reference mounting position, respectively.

Advantageously, this different configuration of the two types of seat rail adapters results in that the first and the second aircraft seats, when mounted in the grid onto the seat rail, have a spacing between the respective seat reference points which is not an integer multiple of the grid pitch of the seat rail.

Hence, due to the different types of seat rail adapters, the passenger's seating position or, more precisely, the seat reference point is offset between the first aircraft seat and the second aircraft seat such that the spacing there between is not an integer multiple of the grid pitch. This offset directly results from the different configurations of the two types of seat rail adapters, despite the fact that both aircraft seats are mounted in the grid onto the seat rail.

According to an aspect of the invention, an aircraft seat arrangement is proposed comprising at least a first and a second aircraft seat for being mounted directly one after the other onto a seat rail which extends along a longitudinal direction of an aircraft cabin. The seat rail provides a grid of reference mounting positions with a pre-determined grid pitch for mounting at least the first and the second aircraft seat. Each of the first and the second aircraft seat comprises a seating structure having a seating area and a backrest extending upwards from the seating area wherein a seat reference point is defined at the connection between the seating area and the backrest, a support supporting the seating structure, and one of a first and a second seat rail adapter connected on the support, the first and the second seat rail adapter being configured to mount the support at a reference mounting position onto the seat rail. The first aircraft seat comprises the first seat rail adapter and the second aircraft seat comprises the second seat rail adapter. The first seat rail adapter is configured such that the seat reference point of the first aircraft seat is spaced in the longitudinal direction from the reference mounting position at which the first seat rail adapter is connected, by a first distance. The second seat rail adapter is configured such that the seat reference point of the second aircraft seat is spaced in the longitudinal direction from the reference mounting position at which the second seat rail adapter is connected, by a second distance. Further, the first distance differs from the second distance such that at least the first and the second aircraft seats, when mounted in the grid onto the seat rail, have a spacing between the respective seat reference points which is not an integer multiple of the grid pitch of the seat rail.

Advantageously, the at least two aircraft seats of the aircraft seat arrangement are suitable for being mounted onto a seat rail providing a grid with a pre-determined grid pitch. Particularly, each of the two types of the first and second seat rail adapters is configured to enable the mounting in the grid onto the seat rail. Thus, the spacing between two aircraft seats in the longitudinal direction, when mounted in the grid onto the seat rail, would normally be an integer multiple of the grid pitch (i.e. whole numbered multiple of the grid pitch).

Conversely, aspects of the invention suggest providing two types of seat rail adapters such that the spacing between the two aircraft seats is not restricted in this respect, but instead can be a non-integer multiple of the grid pitch of the seat rail. This advantage is independent of whether or not the two aircraft seats are actually mounted onto the seat rail since the advantage only results from the different configuration of the two types of seat rail adapters and their utilization within the respective two aircraft seats.

In a preferred embodiment of the aircraft seat arrangement, according to the invention, the seat reference point of each of the at least two aircraft seats is defined according to SAE International Aerospace Standard AS8049.

Advantageously, this definition of a seat reference point is commonly used in the field of aircraft seats for defining a common reference point in the longitudinal direction.

In another preferred embodiment of the aircraft seat arrangement, according to the invention, each of the first and second seat rail adapters includes at least one stud for engaging the seat rail in the grid. For these two seat rail adapters, a foremost of the at least one stud defines the respective reference mounting position. The term foremost refers to the first of the at least one studs in the longitudinal direction.

Advantageously, also this definition of the reference mounting position is commonly used in the field of aircraft seats for defining a common reference point for specifying the mounting position on a grid based seat rail in the longitudinal direction.

In further preferred embodiment of the aircraft seat arrangement, according to the invention, the support of each of the first and the second aircraft seat comprises a first connector assembly defining a connecting point which has a distance in the longitudinal direction to the seat reference point, this distance being the same for each of the first and the second aircraft seat, and each of the first and second seat rail adapter of the first and second aircraft seat comprises a second connector assembly connectable at the connection point to the first connector assembly for connecting the respective one of the first and the second seat rail adapters on the support.

Advantageously, due to a same connecting point for each of the first and second aircraft seat, it is immediately apparent that the first and second seat rail adapters configure the respective first and second aircraft seats such that they allow for a more flexible distribution in the aircraft cabin.

In yet another preferred embodiment of the aircraft seat arrangement, according to the invention, the support of the first and second aircraft seat comprises a front strut and a back strut, and each of the first and second seat rail adapters comprises a front and a back seat rail adapter part that are connected to a front and a back strut on the support, respectively. The reference mounting position is where the front seat rail adapter part of each of the first and second seat rail adapters is configured to mount the support onto the seat rail.

In an even further preferred embodiment of the aircraft seat arrangement, according to the invention, the spacing in the longitudinal direction is an integer multiple plus half of the grid pitch of the seat rail.

Advantageously, with the definition of the spacing to be an integer multiple plus half the grid pitch, a distance between three aircraft seats can be distributed evenly, provided the three aircraft seats include the two types of seat rail adapters in an alternating fashion. In other words, under the assumption that three aircraft seats are mounted directly one after the other in the grid onto the seat rail, and the that the first and third aircraft seat include a same type of the two types of seat rail adapters, and the second aircraft seat includes a different type of the two types of seat rail adapters, then, with the spacing of an integer multiple plus half the grid pitch, the distance between the first and second aircraft seat and between the second and the third aircraft seat (i.e. their seat reference points) is the same and also not an integer multiple of the grid pitch.

In another preferred embodiment of the aircraft seat arrangement, according to the invention, the grid pitch is 2.54 cm (or 1 inch), and half of the grid pitch is 1.27 cm (or ½ inch).

Advantageously, seat rails for use in aircraft cabin arrangement are commonly provided with a grid pitch of 2.54 cm (or 1 inch). This grid pitch has proven beneficial in that it balances the flexibility of positioning aircraft seats with the clearance structurally required to facilitate a secure mounting position thereof.

In a further preferred embodiment of the aircraft seat arrangement, according to the invention, same comprises a third aircraft seat for being mounted directly after the second aircraft seat onto a seat rail. The third aircraft seat comprises a seating structure having a seating area and a backrest extending upwards from the seating area wherein a seat reference point is defined at the connection between the seating area and the backrest, a support supporting the seating structure, and a third seat rail adapter connected on the support, the third seat rail adapter being configured to mount the support at a reference mounting position onto the seat rail. The third seat rail adapter of the third aircraft seat is of a same type as the first seat rail adapter and of a different type as the second seat rail adapter.

Advantageously, the three (or more) aircraft seats include alternatingly, one after the other the two types of seat rail adapters in the aircraft cabin arrangement in the direction of the seat rail structure. Thereby, the highest degree of flexibility is achieved when distributing the aircraft seats within the aircraft cabin arrangement.

According to another aspect of the invention, an aircraft cabin arrangement is suggested comprising a seat rail and at least a first and a second aircraft seat that are mounted directly one after the other onto the seat rail which extends along a longitudinal direction of an aircraft cabin. The seat rail provides a grid of reference mounting positions with a pre-determined grid pitch for mounting at least the first and second aircraft seat. Each of the first and second aircraft seat comprises: a seating structure having a seating area and a backrest extending upwards from the seating area wherein a seat reference point is defined at the connection between the seating area and the backrest, a support supporting the seating structure, and one of a first and a second seat rail adapter mounted on the support, the first and the second seat rail adapter being configured to connect the support at a reference mounting position onto the seat rail. The first aircraft seat comprises the first seat rail adapter and the second aircraft seat comprises the second seat rail adapter.

The first seat rail adapter is configured such that the seat reference point of the first aircraft seat is spaced in the longitudinal direction from the reference mounting position at which the first seat rail adapter is connected, by a first distance. The second seat rail adapter is configured such that the seat reference point of the second aircraft seat is spaced in the longitudinal direction from the reference mounting position at which the second seat rail adapter is connected, by a second distance. The first distance differs from the second distance such that at least the first and the second aircraft seats, when mounted in the grid onto the seat rail, have a spacing between the respective seat reference points which is not an integer multiple of the grid pitch of the seat rail.

In another preferred embodiment of the aircraft cabin arrangement, according to the invention, each of the first and second seat rail adapters comprises at least one stud for engaging the seat rail in the grid, and a foremost of the at least one stud defines the respective reference mounting position.

In further preferred embodiment of the aircraft cabin arrangement, according to the invention, the support of each of the first and the second aircraft seat comprises a first connector assembly defining a connecting point which has a distance in the longitudinal direction to the seat reference point, this distance being the same for each of the first and the second aircraft seat, and each of the first and second seat rail adapter of the first and second aircraft seat comprises a second connector assembly connectable at the connection point to the first connector assembly for connecting the respective one of the first and the second seat rail adapters on the support.

In yet another preferred embodiment of the aircraft cabin arrangement, according to the invention, the support of the first and second aircraft seat comprises a front strut and a back strut, and each of the first and second seat rail adapters comprises a front and a back seat rail adapter part that are connected to a front and a back strut on the support, respectively. The reference mounting position is where the front seat rail adapter part of each of the first and second seat rail adapter is configured to mount the support onto the seat rail.

In an even further preferred embodiment of the aircraft cabin arrangement, according to the invention, the spacing in the longitudinal direction is an integer multiple plus half of the grid pitch of the seat rail.

In a further preferred embodiment of the aircraft cabin arrangement, according to the invention, same comprises a third aircraft seat that is mounted directly after the second aircraft seat onto a seat rail which comprises: a seating structure having a seating area and a backrest extending upwards from the seating area wherein a seat reference point is defined at the connection between the seating area and the backrest, a support supporting the seating structure, and a third seat rail adapter connected on the support, the third seat rail adapter being configured to mount the support at a reference mounting position onto the seat rail. The third seat rail adapter of the third aircraft seat is of a same type as the first seat rail adapter and of a different type as the second seat rail adapter.

According to a further aspect, an aircraft seat kit is suggested comprising at least a first aircraft seat for being mounted onto a seat rail which extends along a longitudinal direction of an aircraft cabin. The seat rail provides a grid of reference mounting positions with a pre-determined grid pitch for mounting at least the first aircraft seat. The first aircraft seat comprises: a seating structure having a seating area and a backrest extending upwards from the seating area wherein a seat reference point is defined at the connection between the seating area and the backrest, a support supporting the seating structure, and one of a first and a second seat rail adapter connected on the support, the first and the second seat rail adapter being configured to mount the support at a reference mounting position onto the seat rail. The first seat rail adapter is configured such that the seat reference point of the first aircraft seat is spaced in the longitudinal direction from the reference mounting position at which the first seat rail adapter is connected, by a first distance. The second seat rail adapter is configured such that the seat reference point of the first aircraft seat is spaced in the longitudinal direction from the reference mounting position at which the second seat rail adapter is connected, by a second distance. The first distance differs from the second distance such that when two of the first aircraft seats are mounted one after the other in the grid onto the seat rail, there is a spacing between the respective seat reference points which is not an integer multiple of the grid pitch of the seat rail.

Advantageously, the aircraft seat kit comprises both, the first and the second seat rail adapter to be interchangeably connected on the support of the first aircraft seat to allow a more flexibly distribution of the aircraft seat in the aircraft cabin. In other words, even though the first and second aircraft seat rail adapter are alternatingly (i.e. not at the same time) connectable on the support, the mere presence of both the first and the second seat rail adapter in the aircraft seat kit enhances the flexibility of distributing the respective aircraft seat.

In a preferred embodiment of the aircraft seat kit, according to the invention, the two of the first aircraft seats can be those described with respect to the above preferred embodiments of the aircraft seat arrangement.

BRIEF DESCRIPTION OF THE DRAWINGS

In the following, aspects of the invention will be explained in more detail with reference being made to the embodiment depicted in the accompanying drawing, by way of example only.

DETAILED DESCRIPTION

Figure 1:
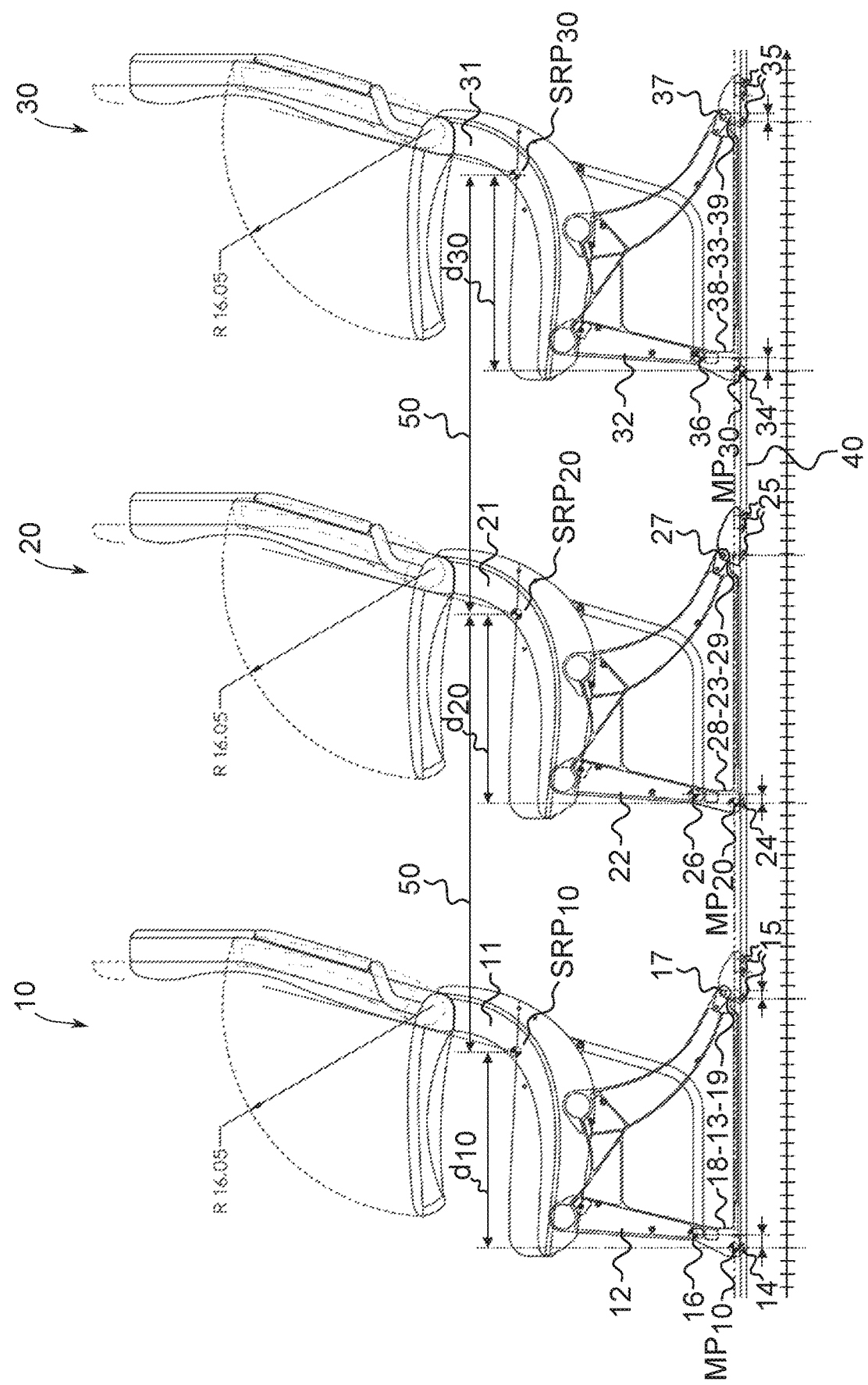
FIG. 1 shows in a schematic view an aircraft cabin arrangement according to a first embodiment of the invention.

In FIG. 1 exemplary embodiments of an aircraft cabin arrangement according to the invention is shown. The illustrated aircraft cabin arrangement comprises a seat rail 40 and three aircraft seats, namely a first aircraft seat 10, a second aircraft seat 20, and a third aircraft seat 30.

All three, the first, second, and third aircraft seats 10, 20, 30 are mounted directly one after the other onto the seat rail 40 which extends along the longitudinal direction of the aircraft cabin arrangement. Accordingly, the first, second, and third aircraft seats 10, 20, 30 resemble three subsequent rows in the aircraft cabin arrangement.

The seat rail 40 of the aircraft cabin arrangement is provided with a grid having a pre-determined grid pitch for mounting the aircraft seats. In other words, the first, second, and third aircraft seats 10, 20, 30 of the aircraft cabin arrangement can only be mounted in the grid of reference mounting position onto the seat rail 40, hence are restricted to mounting positions spaced apparat by the pre-determined grid pinch.

For ease of understanding, the grid of the seat rail 40 with the pre-determined grid pitch is also exemplified in the figure in form of a horizontal axis. This longitudinal axis is subdivided into a plurality sections which correspond to the pre-determined grid pitch of the seat rail 40. Each of the intersections (i.e. the cross-points) with the longitudinal axis marks a possible mounting position for an aircraft seat in the grid onto the seat rail.

Particularly, the grid of the seat rail 40 is spaced equidistantly, such that the seat rail is provided with one and only one pre-determined grid pitch. Conventionally, for aircraft cabins the grid pitch is 2.54 cm (or 1 inch). An exemplary seat rail with a grid pitch of 2.54 cm (or 1 inch) and has a c-shaped longitudinal profile with a plurality of vertical holes defining the grid.

Further, each of the first, second, and third aircraft seat 10, 20, 30 is provided with a seating structure 11, 21, 31. The seating structures 11, 21, 31 comprise a seat pan, a seat cushion with a seating area, and a seat back or backrest. Hence, the seating structure 11, 21, 31 enables a passenger to sit in the aircraft seat 10, 20, respectively. For the sake of completeness, it shall be noted that each of the seating structures 11, 21, 31 of the first, second, and third aircraft seat 10, 20, 30 also has a foldable arm rest.

The geometry and construction of the seating structures 11, 21, 31 of the first, second, and third aircraft seats 10, 20, 30 define a seat reference point SRP10, SRP20, SRP30 for each of the first, second, and third aircraft seats, namely a seat reference point is defined at the connection between the seating area and the backrest of each of the respective first, second and third aircraft seats 10, 20, 30.

Hence, the seat reference point SRP10, SRP20, SRP30 can be readily compared between the first, second, and third aircraft seats, defining a reference point for the passenger's seating position in each of the seating structures 11, 21, 31 of the first, second, and third aircraft seats 10, 20, 30.

Generally, the definition of a seat reference point is commonly known such that this term has a meaning widely recognized in the present field of technology. For this purpose, reference is only made to the definition of the seat reference point provided by the SAE International Aerospace Standard AS8049.

For ease of understanding, each of the seat reference points SRP10, SRP20, SRP30 is illustrated as the intersection of the plane of the seat cushion (or seating area) with the plane perpendicular to the seat pan which touches the forward-most surface of the uncompressed center of the seat back (or backrest). This seat reference points is commonly known as cushion reference point.

Also, each of the first, second, and third aircraft seats 10, 20, 30 is provided with a support 12, 22, 32. The supports 12, 22, 32 support the respective seating structures 11, 21, 31 of the first, second, and third aircraft seats 10, 20, 30.

The supports 12, 22, 32 are each formed as an assembly with a plurality of struts, namely a front strut and a back strut which are connected at their proximal ends to the seat pans of the seating structures 11, 21, 31, respectively. The distal ends of the front and back struts of the support structures 11, 21, 31 are secured to each other with a crossbar which extends at close proximity along the seat rail 40.

Finally, each of the first, second, and third aircraft seats 10, 20, 30 is provided with a seat rail adapter 13, 23, 33. The seat rail adapters 13, 23, 33 of the first, second, and third aircraft seats 10, 20, 30 are connected to the supports 12, 22, 32 and are mounted at a reference mounting position MP10, MP20, MP30 onto the seat rail 40. Hence, the seat rail adapters 13, 23, 33 secure the respective first, second and third aircraft seats 10, 20, 30 onto the seat rail 40 within the aircraft cabin arrangement.

Each of the seat rail adapters 13, 23, 33 consist of two parts, namely a front seat rail adapter part 18, 28, 38 and a back seat rail adapter part 19, 29, 39, that are connected to the front strut and the back strut of the supports 12, 22, 32, respectively. In other words, each of the front and back struts of the supports 12, 22, 32 is mounted via either a front seat rail adapter part 18, 28, 38 or a back seat rail adapter part 19, 29, 39 to the seat rail 40.

Particularly, each of the front and back struts of the supports 12, 22, 32 comprises a first connector assembly for connecting at connection points 16, 17, 26, 27, 36, 37 the respective front or back seat rail adapter parts 18, 19, 28, 29, 38, 39, namely for connecting the second connector assemblies thereof. Accordingly, each of the front and back seat rail adapter parts 18, 28, 38 and 19, 29, 39 comprises a second connector assembly for connecting at connection points 16, 17, 26, 27, 36, 37 the respective first connector assemblies of the supports 12, 22, 32.

In more detail, the front strut of support 12 comprises first connector assembly for connecting at connection points 16 a second connector assembly of the front seat rail adapter part 18, whereas the back strut of support 12 comprises first connector assembly for connecting at connection points 17 a second connector assembly of the respective back seat rail adapter part 19. Similarly, the front strut of support 22 comprises first connector assembly for connecting at connection points 26 a second connector assembly of the front seat rail adapter part 28, whereas the back strut of support 22 comprises first connector assembly for connecting at connection points 27 a second connector assembly of the respective back seat rail adapter part 29. Also, the front strut of support 32 comprises first connector assembly for connecting at connection points 36 a second connector assembly of the front seat rail adapter part 38, whereas the back strut of support 32 comprises first connector assembly for connecting at connection points 37 a second connector assembly of the respective back seat rail adapter part 39.

For example the connection points 16, 26, 36 between first connector assemblies of the front struts and the second connector assembly of the front seat rail adapter parts 18, 28, 38 are configured in form of fixed bearings whereas the connection points 17, 27, 37 between the first connector assemblies of the back struts and the second connector assemblies of the back seat rail adapter parts 19, 29, 39 are configured in form of a pivot bearings. Thereby, the mounting process of the aircraft seats onto the seat rail can be facilitated. First, the back seat rail adapter part19, 29, 39 is mounted onto the seat rail 40. Then, the aircraft seat is pivoted into the mounting position where the front seat rail adapter part 18, 28, 38 is engaging the seat rail 40. Finally, both the front and back seat rail adapter parts are secured onto the seat rail 40.

Notably, each of the first connection assemblies defines a connection point 16, 17, 26, 27, 36, 37 which has a same distance in the longitudinal direction from the respective seat reference point SRP 10, SRP20, SRP30. In other words, the geometry and dimension of the supports 12, 22, 32 and seating structure 11, 21, 31 is the same for the each of the first second and third aircraft seats 10, 20, 30.

Further, each of the seat rail adapters 13, 23, 33 of the first, second, and third aircraft seat 10, 20, 30 comprise plural studs 14, 15, 24, 25, 34, 35 for engaging the seat rail 40 in the grid. In more detail, the front seat rail adapter part of all three seat rail adapters 13, 23, 33 comprises one stud (i.e. a foremost stud), whereas back seat rail adapter part of all three seat rail adapters 13, 23, 33 comprises three studs. All studs are spaced apart at an integer multiple of the grid pitch so as to enable the seat rail adapters 13, 23, 33 to engage the seat rail in the grid.

The geometry and construction of the seat rail adapters 13, 23, 33 of the first, second, and third aircraft seat 10, 20, 30 defines a reference mounting position MP10, MP20, MP30 for each of the first, second, and third aircraft seats. Hence, the reference mounting positions MP10, MP20, MP30 can be readily compared between the first, second, and third aircraft seat 10, 20, 30, defining a reference point for securing each of the aircraft seats to the seat rail 40.

Generally, the definition of a reference mounting positions MP10, MP20, MP30 refers to a common mounting position of each of the first, second, and third aircraft seat 10, 20, 30 namely where the seat rail adapters 13, 23, 33 engage the seat rail 40 in the grid. For seat rail adapters 13, 23, 33 with plural studs 14, 15, 24, 25, 34, 35, the foremost stud 14, 24, 34 of each of the seat rail adapters 13, 23, 33 is defining the reference mounting position MP10, MP20, MP30, and is accordingly indicated, for the ease of understanding, in the figure.

Notably, there are two different types of seat rail adapters. A first type of seat rail adapter, namely as the first seat rail adapter 13, is included in the first aircraft seat 10. A second type of seat rail adapter, namely the second seat rail adapter 23, is included in the second aircraft seat 20. Further, the third aircraft seat 30 again includes, as the third seat rail adapter 33, a first type of seat rail adapter, namely an adapter which corresponds, with respect to its dimension and geometry, to the first seat rail adapter 13 of the first aircraft seat 10.

This distinction between different types of seat rail adapters equally applies to the front and back seat rail adapter parts 18, 19, 28, 29, 38, 39. Since both, the front and the back seat rail adapter parts18, 19, 28, 29, 38, 39 are matched components; they must be equally distinguished into different types of front and back seat rail adapter parts.

The two types of seat rail adapters, namely the first and third seat rail adapter 13, 33 of a first type and seat rail adapter 23 of a second type, differ from each other in that they configure the first and second aircraft seat 10, 20, and equally the second and third aircraft seat 20, 30 with a different distance d10, d20, and d20, d30 in the longitudinal direction, between the seat reference point SRP10, SRP20, and SRP20, SRP30 and the reference mounting position MP10, MP20, and MP20, MP30 respectively.

In other words, the first seat rail adapter 13 is configured such that the seat reference point SRP10 of the first aircraft seat 10 is spaced in the longitudinal direction from the reference mounting position MP10 at which the first seat rail adapter is connected, by a first distance d10. The second seat rail adapter 23 is configured such that the seat reference point MP20 of the second aircraft seat MP20 is spaced in the longitudinal direction from the reference mounting position MP20 at which the second seat rail adapter is connected, by a second distance d20. Also the third seat rail adapter 33 is configured such that the seat reference point SRP30 of the third aircraft seat 30 is spaced in the longitudinal direction from the reference mounting position MP30 at which the third seat rail adapter is connected, by a third distance d30.

Here, the first distance d10 differs from the second distance d20 of the respectively configured first and second seat rail adapters 13, 23 and the second distance d20 differs from the third distance d30 of the respectively configured second and third seat rail adapter 23, 33.

As can be seen from the figure, the distance d1o between the seat reference point SRP10 and the reference mounting position MP10 for the first aircraft seat 10 is larger than the distance d20 between the seat reference point SRP20 and the reference mounting position MP20 for the second aircraft seat 20. Equally, the distance d20 between the seat reference point SRP20 and the reference mounting position MP20 for the second aircraft seat 20 is smaller than the distance d30 between the seat reference point SRP30 and the reference mounting position MP30 for the third aircraft seat 30.

In other words, with respect to each of the reference mounting positions MP10, MP20, MP30, the passenger's seating position in the first and third aircraft seat 10, 30 (i.e. the seat reference point SRP10 and SRP30 thereof) is a little more backward than the seating position in the second aircraft seat 20 (i.e. the seat reference point SRP20 thereof).

For clarity reasons, it shall again be emphasized that this difference between distances d10, d30 and d20 for the respective first, second, and third aircraft seats 10, 20, 30 only results from the different types of seat rail adapters 13, 23, 33 included in each of the first, second, and third aircraft seats 10, 20, 30. All three, the first, second, and third aircraft seats 10, 20, 30 are provided with the same seating structure 11, 21, 31 and support 12, 22, 32 such that this difference in distances d10, d20, d30 does not influence the seating comfort.

Instead, this difference between distances d10, d30 and d20, originating from the different types of for the first, second, and third seat rail adapter 13, 23, 33, only results in different spacings 50 between the first, second, and third aircraft seats 10, 20, 30. In other words, this difference in distances d10, d20, d30 only affects the foot space between the first, second, and third aircraft seats 10, 20, 30, namely the foot space of the passenger seated in the respective aircraft seats 10, 20, 30.

The two types of seat rail adapters, used as the first, second and third seat rail adapters13, 23, 33 in alternating fashion, differ from each other such that subsequent aircraft seats 10, 20, 30, when mounted in the grid onto the seat rail, have a spacing 50 between the respective seat reference points SRP10, SRP20, and SRP 20, SRP30 which is not an integer multiple of the grid pitch of the seat rail 40. In other words, these two types of seat rail adapters allow for a passenger's seating positions which are not restricted to integer multiples of the grid pitch but, instead, can take values which are not integer multiples of same grid pitch and depend on the geometry and construction thereof.

In general terms, the two different types of seat rail adapters 13, 33 and 23 of the first, second, and third aircraft seats 10, 20, 30 differ from each other (e.g. when put side-by-side) in the longitudinal direction in that the connection points 16, 17, 26, 27, 36, 37 have a different offset from the respective reference mounting point MP10, MP20, MP30, such that the respective first, second, and third aircraft seats 10, 20, 30 are configured with a spacing 50 which is not an integer multiple of the grid pitch. Particularly, the spacing 50 is an integer multiple plus half of the grid pitch. This spacing 50 will be explained in more detail with respect to FIG. 2.

In summary, in the aircraft cabin the conventional aircraft seats are only mountable onto the seat rail 40 at mounting positions that are spaced apart by integer multiples of the grid pitch of the seat rail. In other words, the grid pitch is the smallest unit step by which two conventional aircraft seats, in an aircraft cabin, may be positioned closer towards or farther away from each other.

Conversely, the invention proposes two different types of seat rail adapters which remedy this loss in flexibility. A first type of seat rail adapter 13 is configured to mount the support 12, and accordingly the entire aircraft seat 10, at a first relative position to the grid of the seat rail 40. A second type of seat rail adapter 23 is configured to mount the support 22, and accordingly the entire aircraft seat, at a second, different relative position to the grid of the seat rail 40. The first type of seat rail adapter 33 is again configured to mount the support 32, and accordingly the entire aircraft seat 30, at a first relative position to the grid of the seat rail 40.

Depending on which of the two types of seat rail adapters is included in the aircraft seat, the passenger's seating position assumes a different position with respect to the mounting position, i.e. with respect to the grid of the seat rail onto which the aircraft seat is mounted. In other words, since the two types of seat rail adapters allow for a mounting position with either a first relative position or a second relative position with respect to the grid of the seat rail, the passenger's seating position of two aircraft seats with different types of seat rail have a spacing with respect to each other which is not an integer multiple of the grid pitch.

Particular, the spacing results from the different configuration of the two types of seat rail adapters in the longitudinal direction of the aircraft cabin arrangement, i.e. along the same direction in which the seat rail extends. Accordingly, the different types of seat rail adapters have an effect on the spacing between subsequent aircraft seats within the aircraft cabin arrangement, i.e. in the longitudinal direction thereof, hence increase the flexibility of distributing the aircraft seats with the aircraft cabin arrangement.

Figure 2:
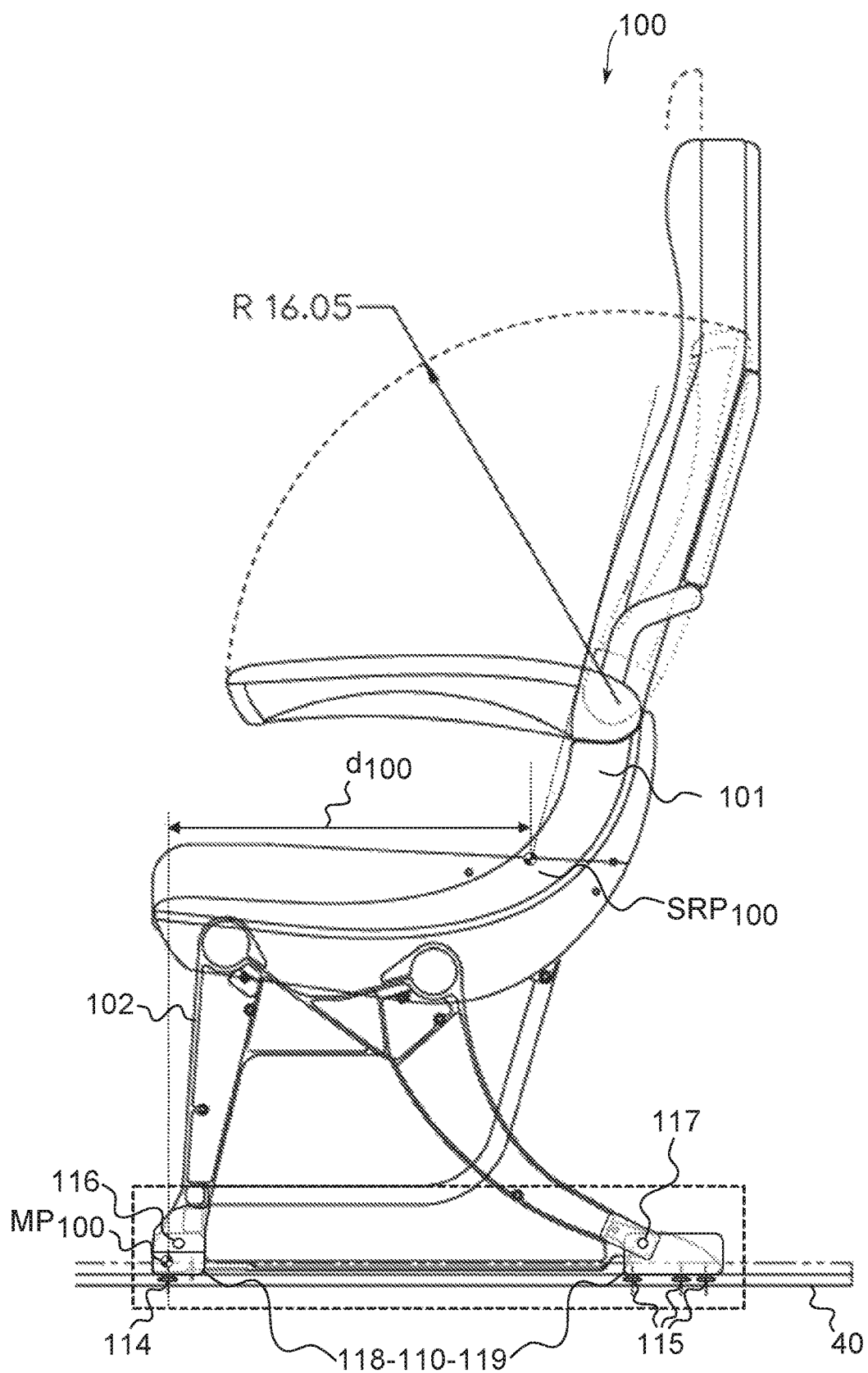
FIGS. 2 and 3 illustrates a detailed view of an aircraft seat kit including a first aircraft seat for being mounted onto a seat rail according to another embodiment of the invention.
Figure 3:
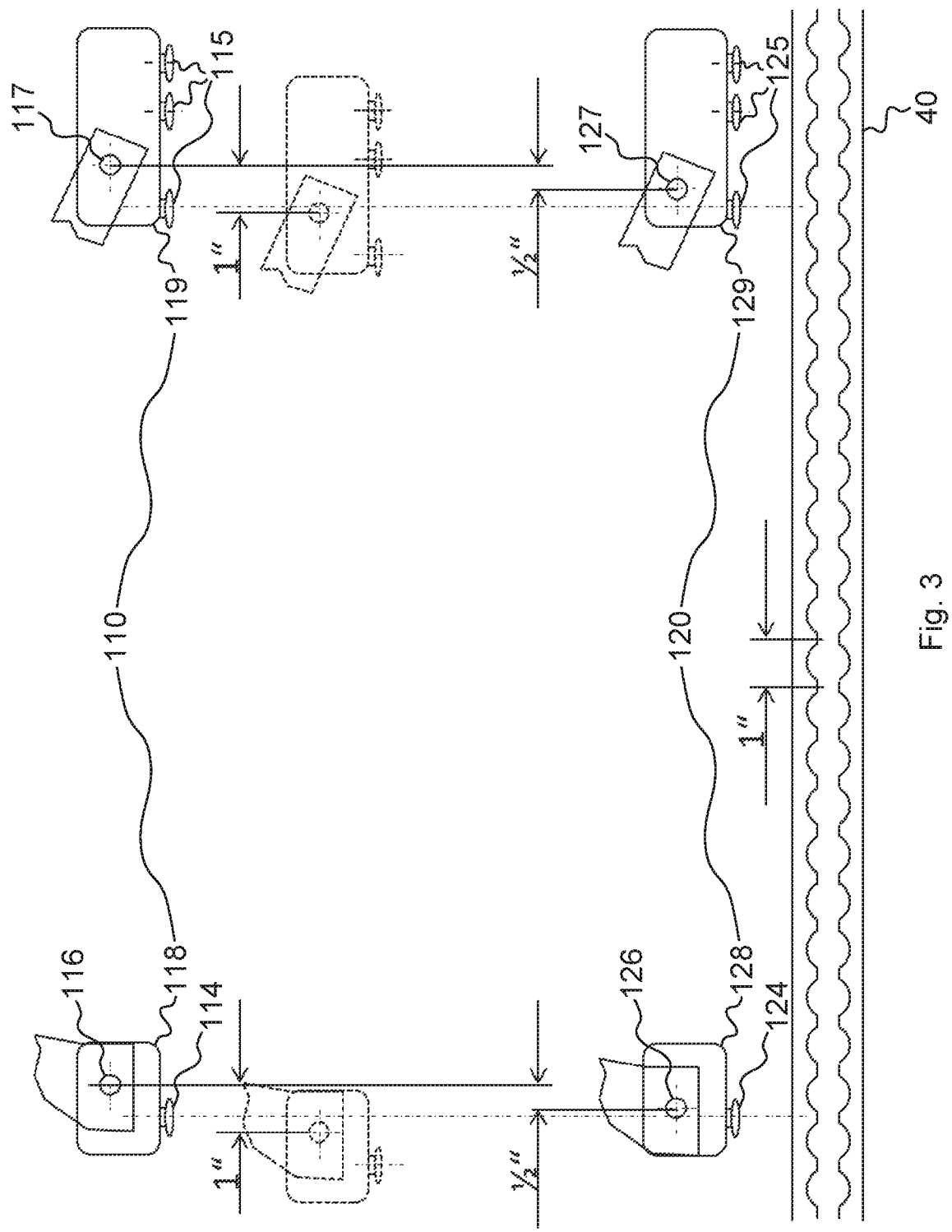

Referring now to FIGS. 2 and 3, a detailed view of an aircraft seat kit including a first aircraft seat 100 for being mounted onto a seat rail 40 according to another embodiment of the invention is shown. The aircraft seat kit employs the same concepts of two different types of seat rail adapters as already discussed before, however, with the focus on only a single aircraft seat, namely the aircraft seat 100. Particularly, the dashed box of FIG. 2 is pictured as enlarged view in FIG. 3, namely with the different types of seat rail adapters below one another.

The first aircraft seat 100 is mountable onto the seat rail 40 which extends along a longitudinal direction of an aircraft cabin arrangement, where the seat rail 40 provides a grid with a pre-determined grid pitch of reference mounting positions for mounting at least the first aircraft seat. Since the seat rail 40 has already been described above, further details thereof are omitted for conciseness reasons.

Further, the first aircraft seat 100 includes a seating structure 101 having a seating area and a backrest extending upwards from the seating area wherein a seat reference point SRP100 is defined at the connection between the seating area and the backrest. Alternative definitions for the seat reference point can equally be applied.

The first aircraft seat 100 also includes a support 102 supporting the seating structure 101, and one of a first and a second seat rail adapter 110, 120 connected on the support 101. Consistent with the above, the first and second seat rail adapters 110, 120 are of different types of seat rail adapters which employ the same concept of increasing the flexibility of distributing the aircraft seats with the aircraft cabin.

Each of the seat rail adapters 110, 120 consists of two parts, namely a front seat rail adapter part 118,128 and a back seat rail adapter part 119 129, that are connected at connection points 116, 117 or 126, 127 to the front strut and the back strut of the support 102, respectively. For this purpose, each of the front and back strut of the support 102 comprises a first connector assembly that is connectable at connection points 116, 117 or 126, 127 to a respective second connector assembly of the front and back seat rail adapter parts 118, 119 or 128, 129.

Further, each front seat rail adapter part 118,128 and a back seat rail adapter part 119 129, of the first aircraft seat 100 comprise plural studs 114, 115, 124 125 for engaging the seat rail 40 in the grid.

The first and the second seat rail adapter 110, 120 are configured to mount the support 102 at a reference mounting position MP100 onto the seat rail 40. Also here, the geometry and construction of the seat rail adapters 110, 120 define the reference mounting position MP100 for the first aircraft seat 100, namely where the seat rail adapters 110, 120 engage the seat rail 40 in the grid.

For seat rail adapters 110, 120 with plural studs 114, 115, 124, 125 the foremost stud 114, 124 of each of the seat rail adapters 110, 120 is defining the reference mounting position MP100, and is accordingly indicated, for the ease of understanding, in the figure. In more detail, the front seat rail adapter part 118, 128 of the first and second seat rail adapter 110, 120 comprises one stud 114, 124 (i.e. a foremost stud), whereas back seat rail adapter parts 119, 129 of the seat rail adapters 110, 120 comprise three studs 115, 125

The first seat rail adapter 110 is configured such that the seat reference point SRP100 of the first aircraft seat 100 is spaced in the longitudinal direction from the reference mounting position MP100 at which the first seat rail adapter 100 is connected, by a first distance d100, and the second seat rail adapter 120 is configured such that the seat reference point (not shown) of the first aircraft seat 100 is spaced in the longitudinal direction from the reference mounting position at which the second seat rail adapter is connected, by a second distance.

The first distance d100 differs from the second distance such that when two of the first aircraft seats are mounted directly one after the other in the grid onto the seat rail 40, there is a spacing between the respective seat reference points which is not an integer multiple of the grid pitch of the seat rail 40.

In other words, the first seat rail adapter 110 configures, with respect to the reference mounting position MP100, the passenger's seating position in the first aircraft seat 100 (i.e. the seat reference point SRP100) a little more backward than in the case the second seat rail adapter 120 is included in the first aircraft seat 100. For clarity reasons, it shall be emphasized that both, the first and the second seat rail adapter 110, 120 may, both interchangeably be included in the first aircraft seat 100, depending on which passenger's seating position shall be taken.

This distinction between different types of seat rail adapters equally applies to the front and back seat rail adapter parts 118, 119, 128, 129. Since both, the front and the back seat rail adapter parts 118, 119, 128, 129 are matched components they must be equally distinguished into different types of front and back seat rail adapter parts.

In general terms, the two different types of seat rail adapters 110, 120 differ from each other (e.g. when put side-by-side as exemplified in FIG. 3) in the longitudinal direction in that the connection points 116, 117, and 126, 127 have a different offset from the respective reference mounting point MP10 (or the foremost stud 114, 124) respectively, such that the first and second seat rail adapters 110, 120 can configures the first aircraft seat 100 with a spacing to another aircraft seat which not an integer multiple of the grid pitch. Particularly, the spacing is an integer multiple plus half of the grid pitch (i.e. ½ inch or 1.27 cm).

Advantageously, this spacing of integer multiples plus half the grid pitch would not be possible if only a single type of seat rail adapters was employed. In case the first seat rail adapter 110 is used, this would only allow for mounting positions corresponding to integer multiples of the grid pitch. As exemplarily shown in FIG. 3 a different mounting position of the front seat rail adapter part and the back seat rail adapter part of the first seat rail adapter is shown in dashed lines.

REFERENCE NUMERALS

10 first aircraft seat
11 seating structure
12 support
13 seat rail adapter
14 foremost stud
15 back studs
16 connection point
17 connection point
18 font seat rail adapter part
19 back seat rail adapter part
SRP10 seat reference point
MP10 reference mounting position
d10 distance
20 second aircraft seat
21 seating structure
22 support
23 seat rail adapter
24 foremost stud
25 back studs
26 connection point
27 connection point
28 font seat rail adapter part
29 back seat rail adapter part
SRP20 seat reference point
MP20 reference mounting position
d20 distance
30 third aircraft seat
31 seating structure
32 support
33 seat rail adapter
34 foremost stud
35 back studs
36 connection point
37 connection point
38 font seat rail adapter part
39 back seat rail adapter part
SRP30 seat reference point
MP30 reference mounting position
d30 distance
40 seat rail
50 spacing
100 first aircraft seat
101 seating structure
102 support
110 first seat rail adapter
114 foremost stud
115 back studs
116 connection point
117 connection point
118 front seat rail adapter part
119 back seat rail adapter part
120 second seat rail adapter 124 foremost stud
125 back studs
126 connection point
127 connection point
128 front seat rail adapter part
129 back seat rail adapter part
SRP100 seat reference point
MP100 reference mounting position
d100 distance

The invention claimed is:

1. An aircraft seat arrangement comprising at least a first and a second aircraft seat for being mounted directly one after the other onto a seat rail which extends along a longitudinal direction of an aircraft cabin, the seat rail providing a grid of reference mounting positions with a pre-determined grid pitch for mounting at least the first and the second aircraft seat,
  wherein each of the first and the second aircraft seat comprises:
    a seating structure having a seating area and a backrest extending upwards from the seating area wherein a seat reference point is defined at the connection between the seating area and the backrest;
    a support supporting the seating structure; and
  one of a first and a second seat rail adapter connected on the support, the first and the second seat rail adapter configured to mount the support at a reference mounting position onto the seat rail,
  wherein the first aircraft seat comprises the first seat rail adapter and the second aircraft seat comprises the second seat rail adapter, wherein the first seat rail adapter comprises a first front seat rail adapter part and a first back seat rail adapter part and the second seat rail adapter comprises a second front seat rail adapter part and a second back seat rail adapter part, wherein the second seat rail adapter is structurally different than the first seat adapter,
  wherein the first seat rail adapter is configured such that the seat reference point of the first aircraft seat is spaced in the longitudinal direction from the reference mounting position at which the first seat rail adapter is connected, by a first distance;
  wherein the second seat rail adapter is configured such that the seat reference point of the second aircraft seat is spaced in the longitudinal direction from the reference mounting position at which the second seat rail adapter is connected, by a second distance; and
  wherein the first distance differs from the second distance such that at least the first and the second aircraft seats, when mounted in the grid onto the seat rail, have a spacing between the respective seat reference points which is not an integer multiple of the grid pitch of the seat rail.

2. The aircraft seat arrangement according to claim 1, wherein each of the first and second seat rail adapters comprises at least one stud for engaging the seat rail in the grid, and a foremost of the at least one stud defines the respective reference mounting position.

3. The aircraft seat arrangement according to claim 1, wherein
  the support of each of the first and the second aircraft seat comprises a first connector assembly defining a connecting point which has a distance in the longitudinal direction to the seat reference point, this distance being the same for each of the first and the second aircraft seat, and
  each of the first and second seat rail adapter of the first and second aircraft seat comprises a second connector assembly connectable at the connection point to the first connector assembly for connecting the respective one of the first and the second seat rail adapters on the support.

4. The aircraft seat arrangement according to claim 1, wherein
  the support of the first and second aircraft seat comprises a front strut and a back strut, and
  each of the first and second seat rail adapters comprises a front and a back seat rail adapter part that are connected to a front and a back strut on the support, respectively,
  wherein the reference mounting position is where the front seat rail adapter part of each of the first and second seat rail adapter is configured to mount the support onto the seat rail.

5. The aircraft seat arrangement according to claim 1, wherein the spacing in the longitudinal direction is an integer multiple plus half of the grid pitch of the seat rail.

6. The aircraft seat arrangement according to claim 1, further comprising:
  a third aircraft seat for being mounted directly after the second aircraft seat onto the seat rail, the third aircraft seat comprises:
    a seating structure having a seating area and a backrest extending upwards from the seating area wherein a seat reference point is defined at the connection between the seating area and the backrest,
    a support supporting the seating structure, and
    a third seat rail adapter connected on the support, the third seat rail adapter configured to mount the support at a reference mounting position onto the seat rail,
  wherein the third seat rail adapter of the third aircraft seat is of a same type as the first seat rail adapter and of a different type as the second seat rail adapter.

7. An aircraft cabin arrangement comprising a seat rail and at least a first and a second aircraft seat that are mounted directly one after the other onto the seat rail which extends along a longitudinal direction of an aircraft cabin, the seat rail providing a grid of reference mounting position with a pre-determined grid pitch for mounting at least the first and second aircraft seat,
  wherein each of the first and second aircraft seat comprises:
    a seating structure having a seating area and a backrest extending upwards from the seating area wherein a seat reference point is defined at the connection between the seating area and the backrest,
    a support supporting the seating structure, and
    one of a first and a second seat rail adapter mounted on the support, the first and the second seat rail adapter being configured to connect the support at a reference mounting position onto the seat rail,
  wherein the first aircraft seat comprises the first seat rail adapter and the second aircraft seat comprises the second seat rail adapter, wherein the first seat rail adapter comprises a first front seat rail adapter part and a first back seat rail adapter part and the second seat rail adapter comprises a second front seat rail adapter part and a second back seat rail adapter part, wherein the second seat rail adapter is structurally different than the first seat rail adapter;
  wherein the first seat rail adapter is configured such that the seat reference point of the first aircraft seat is spaced in the longitudinal direction from the reference mounting position at which the first seat rail adapter is connected, by a first distance;

wherein the second seat rail adapter is configured such that the seat reference point of the second aircraft seat is spaced in the longitudinal direction from the reference mounting position at which the second seat rail adapter is connected, by a second distance; and wherein the first distance differs from the second distance such that at least the first and the second aircraft seats, when mounted in the grid onto the seat rail, have a spacing between the respective seat reference points which is not an integer multiple of the grid pitch of the seat rail.

8. The aircraft cabin arrangement according to claim 7, wherein each of the first and second seat rail adapters comprises at least one stud for engaging the seat rail in the grid, and a foremost of the at least one stud defines the respective reference mounting position.

9. The aircraft cabin arrangement according to claim 7, wherein the support of each of the first and the second aircraft seat comprises a first connector assembly defining a connecting point which has a distance in the longitudinal direction to the seat reference point, this distance being the same for each of the first and the second aircraft seat, and
each of the first and second seat rail adapter of the first and second aircraft seat comprises a second connector assembly connectable at the connection point to the first connector assembly for connecting the respective one of the first and the second seat rail adapters on the support.

10. The aircraft cabin arrangement according to claim 7, wherein
the support of the first and second aircraft seat comprises a front strut and a back strut, and
each of the first and second seat rail adapters comprises a front and a back seat rail adapter part that are connected to a front and a back strut on the support, respectively,
wherein the reference mounting position is where the front seat rail adapter part of each of the first and second seat rail adapter is configured to mount the support onto the seat rail.

11. The aircraft cabin arrangement according to claim 7, wherein the spacing in the longitudinal direction is an integer multiple plus half of the grid pitch of the seat rail.

12. The aircraft cabin arrangement according to claim 7, further comprising:
a third aircraft seat that is mounted directly after the second aircraft seat onto the seat rail, the third aircraft seat comprising:
a seating structure having a seating area and a backrest extending upwards from the seating area wherein a seat reference point is defined at the connection between the seating area and the backrest,
a support supporting the seating structure, and
a third seat rail adapter connected on the support, the third seat rail adapter being configured to mount the support at a reference mounting position onto the seat rail,
wherein the third seat rail adapter of the third aircraft seat is of a same type as the first seat rail adapter and of a different type as the second seat rail adapter.

13. An aircraft seat kit comprising at least a first aircraft seat for being mounted onto a seat rail which extends along a longitudinal direction of an aircraft cabin, the seat rail providing a grid of reference mounting positions with a pre-determined grid pitch for mounting at least the first aircraft seat,
wherein the first aircraft seat comprises:
a seating structure having a seating area and a backrest extending upwards from the seating area wherein a seat reference point is defined at the connection between the seating area and the backrest,
a support supporting the seating structure, and
one of a first and a second seat rail adapter connected on the support, the first and the second seat rail adapter being configured to mount the support at a reference mounting position onto the seat rail,
wherein the first seat rail adapter is configured such that the seat reference point of the first aircraft seat is spaced in the longitudinal direction from the reference mounting position at which the first seat rail adapter is connected, by a first distance;
wherein the second seat rail adapter is configured such that the seat reference point of the first aircraft seat is spaced in the longitudinal direction from the reference mounting position at which the second seat rail adapter is connected, by a second distance, wherein the first seat rail adapter comprises a first front seat rail adapter part and a first back seat rail adapter part and the second seat rail adapter comprises a second front seat rail adapter part and a second back seat rail adapter part, and wherein the second seat rail adapter is structurally different than the first seat rail adapter; and
wherein the first distance differs from the second distance such that when two of the first aircraft seats are mounted one after the other in the grid onto the seat rail, there is a spacing between the respective seat reference points which is not an integer multiple of the grid pitch of the seat rail.

* * * * *